(12) United States Patent
Yorimoto (10) Patent No.: US 7,911,628 B2
(45) Date of Patent: Mar. 22, 2011

(54) PRINT SYSTEM AND CONTROL METHOD THEREFOR

(75) Inventor: Kouji Yorimoto, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1255 days.

(21) Appl. No.: 11/315,299

(22) Filed: Dec. 23, 2005

(65) Prior Publication Data

US 2007/0013970 A1  Jan. 18, 2007

(30) Foreign Application Priority Data

Jul. 12, 2005  (JP) ................................. 2005-203129

(51) Int. Cl.
- *G06K 15/00* (2006.01)
- *G06F 3/12* (2006.01)
- *H04N 1/32* (2006.01)
- *H04N 1/00* (2006.01)
- *H04N 1/04* (2006.01)

(52) U.S. Cl. ..................... 358/1.14; 358/1.15; 358/1.16; 358/403; 358/407; 358/442; 358/474

(58) Field of Classification Search .................. 358/474, 358/1.1, 1.13–1.17, 1.9, 500, 505, 524, 530, 358/403, 407, 442

See application file for complete search history.

(56) References Cited

U.S. PATENT DOCUMENTS

| | | | | |
|---|---|---|---|---|
| 6,026,258 A | * | 2/2000 | Fresk et al. | ...................... 399/87 |
| 2003/0038998 A1 | * | 2/2003 | McGuire et al. | .............. 358/524 |

FOREIGN PATENT DOCUMENTS

| | | |
|---|---|---|
| CN | 1287289 A | 3/2001 |
| EP | 0 450 663 B1 | 11/1994 |
| EP | 1 083 734 A2 | 3/2001 |
| JP | A-07-322031 | 12/1995 |
| JP | B2-08-15300 | 2/1996 |
| JP | A-08-265469 | 10/1996 |
| JP | A-9-238209 | 9/1997 |
| JP | A-11-155036 | 6/1999 |
| JP | A-2000-332922 | 11/2000 |
| JP | A-2001-345959 | 12/2001 |
| JP | B2-3276806 | 2/2002 |
| JP | A 2002-135486 | 5/2002 |
| JP | A-2002-207584 | 7/2002 |
| JP | B2-3498549 | 12/2003 |

OTHER PUBLICATIONS

Japanese Office Action dated Mar. 12, 2010 for Japanese Application No. 2005-203129 (with translation).
Japanese Office Action mailed Jun. 1, 2010 for Japanese Application No. 2005-203129 (with translation).

* cited by examiner

*Primary Examiner* — James A Thompson
(74) *Attorney, Agent, or Firm* — Oliff & Berridge, PLC (57) ABSTRACT

A print system includes an image reading apparatus that describes original document image data read from an original document in a page description language, and transmits the data described in the page description language as a copy job; and a printing apparatus that receives the copy job transmitted from the image reading apparatus, and prints out an image corresponding to the original document image data, wherein the image reading apparatus detects a copy preparing operation that is performed prior to the transmission of the copy job and transmits an occupancy notification for notifying occupancy of the printing apparatus to the printing apparatus according to the result of the detection, and wherein the printing apparatus accepts a copy job from the image reading apparatus in accordance with the occupancy notification.

9 Claims, 11 Drawing Sheets

DISPLAY OF OCCUPANCY STATE

PRINT SYSTEM AND CONTROL METHOD THEREFOR

BACKGROUND OF THE INVENTION

1. Field of the Invention

The present invention relates to a print system having an image reading apparatus and a printing apparatus, and a control method for such a print system. More particularly, the present invention relates to a print system that is designed to occupy the printing apparatus when a copy preparing operation is detected on the side of the image reading apparatus, and a control method for such a print system.

2. Description of the Related Art

In recent years, prices of office automation (OA) equipment such as copying machines and multi-function copiers have been going down significantly, and hardware makers who provide customers with such OA equipment are required to take measures to cope with this trend.

There has been proposed a scanner/printer system (print system) which is provided with both a scanner and a printer and designed to perform various types of print processing including copy processing by cooperation of the scanner and the printer.

Such conventional print system is advantageous in being capable of performing the print processing including copy processing with simple configuration. Additionally, the cost for introduction of such print system can be suppressed significantly compared to the cost for introduction of a multi-function copier or a copying machine.

When the print processing is performed by this type of print system using its scanner and printer in combination, original document image data read by the scanner from an original document is described (wrapped) in a page description language before being transferred to and output from the printer.

This conventional print system, however, has a problem in that even though the scanner transmits a copy job after ascertaining that the printer is not performing any operations including printing, if a print job has been meanwhile transmitted thereto by another apparatus such as a host terminal, the copy job from the scanner will not be processed and the user is obliged to wait in front of the scanner until this print job is completed.

As a solution of this problem, there is known a technique described in Japanese Patent Application Publication 2002-135486. According to the technique described in this patent publication, when instructions to execute copying is received from the scanner, the printer is controlled to reject a print operation request or a read operation request from other apparatuses, so that the printer can be occupied until completion of the processing requested by the scanner.

Incidentally, before performing copy processing, it is necessary to perform a copy preparing operation on the scanner side to set various parameters (to designate a paper size and a color mode, and to set image quality parameters).

Therefore, according to the technique disclosed in the Japanese Patent Application Publication 2002-135486 in which the printer is occupied only after the start button (job execution start button) is pressed through the operation panel of the scanner, the copy job will not be executed if the printer receives a print job from other apparatus than the scanner during the parameter setting operations. Thus, there are chances in which the user must wait for a long time in front of the scanner until the print job from the other apparatus is completed.

SUMMARY OF THE INVENTION

The present invention has been made in view of the above circumstances and provide a print system that is designed to avoid obliged waiting of the user in front of an image reading apparatus due to execution of a job other than the user's job that is received by the printing apparatus during a copy preparing stage for the user's job, and to provide a control method for such print system.

According to an aspect of the present invention, a print system includes an image reading apparatus that reads original document image data from an original document, describes the original document image data thus read in a page description language, and transmits the data described in the page description language as a copy job; and a printing apparatus that receives the copy job transmitted from the image reading apparatus, and prints out an image corresponding to the original document image data based on the copy job, wherein the image reading apparatus comprises a detector that detects a copy preparing operation that is performed prior to the transmission of the copy job; and an occupancy notification transmitter that transmits an occupancy notification for notifying occupancy of the printing apparatus to the printing apparatus when the copy preparing operation is detected by the detector, and wherein the printing apparatus is shifted to an occupancy mode in which a copy job from the image reading apparatus is accepted in accordance with the occupancy notification transmitted from the occupancy notification transmitter.

BRIEF DESCRIPTION OF THE DRAWINGS

Embodiment of the present invention will be described in detail based on the following figures, wherein.

DETAILED DESCRIPTION OF THE INVENTION

A description will now be made in detail of embodiment of a print system and a control method therefor, with reference to the attached drawings.

Figure 1:
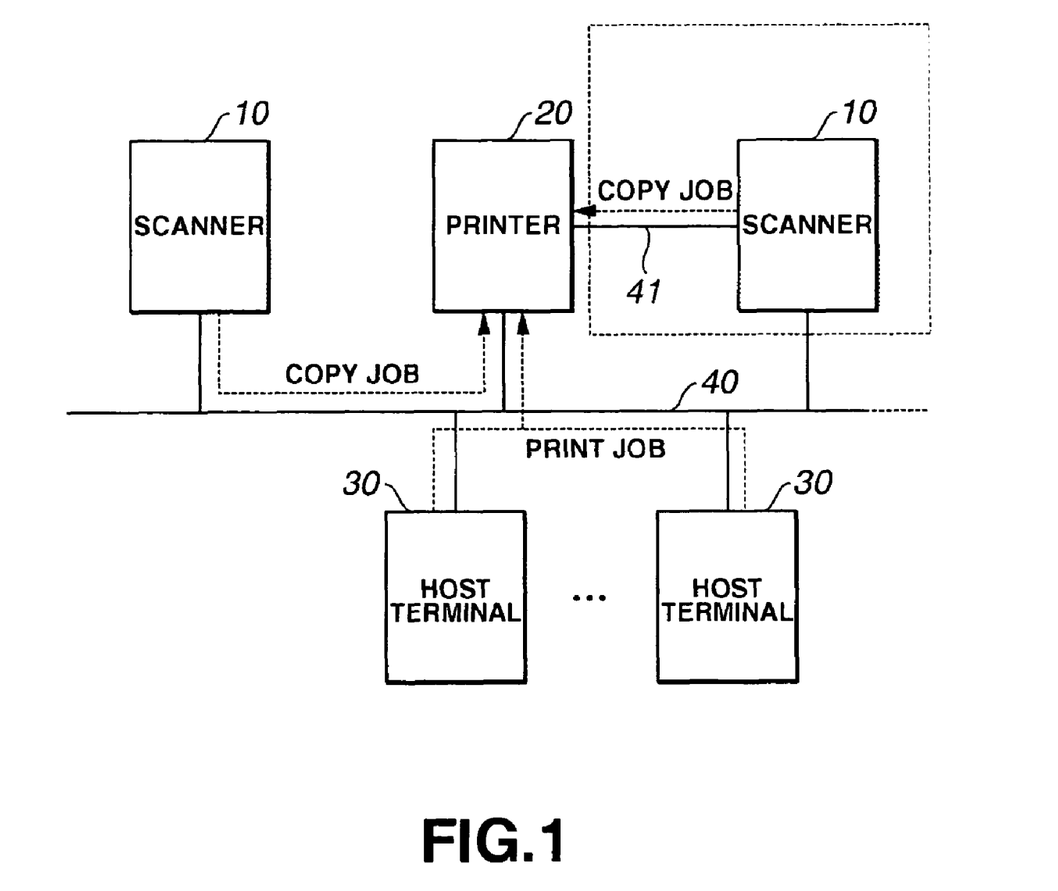
FIG. 1 is a block diagram showing an example of overall configuration of a print system according to an embodiment of the present invention.

FIG. 1 is a block diagram showing an example of overall configuration of a print system according to the embodiment of the present invention.

The print system includes a scanner 10, a printer 20, and one or plural host terminals 30, which are connected together via a network such as a LAN (Local Area Network) 40.

The following description of this embodiment will be made in terms of the case where the scanner 10 is connected to the printer 20 via the LAN 40. However, the scanner 10 and the printer 20 may be connected by any other means as long as they are able to communicate with each other. For example, as shown in the dotted frame in FIG. 1, the scanner 10 may be connected directly to the printer 20 by means of a USB (Universal Serial Bus) or Centronics interface 41.

The scanner 10 is an image reading apparatus which reads graphics, photographs, or characters by scanning an original document that is placed on or conveyed onto a platen glass, and converts them into digital data. The original document image data (bitmapped image) thus read is described in a predetermined page description language, transmitted to the printer 20 as a copy job, and printed by the printer 20.

The printer 20 is a printing apparatus which receives a copy job from the scanner 10 or a print job from a host terminal 30 (hereafter, the copy jobs and the print job are to be collectively referred to as the "job"), interprets the page description language, and performs printing processing. The print system is capable of performing the copy function by cooperating with the scanner 10 to print out the original document image data read by the scanner 10.

The host terminal 30 is a personal computer or the like operated by the user. One or several such host terminals 30 are connected on the LAN 40. Through the host terminal 30, the user is able to select data to be printed and request the printer 20 to print the data.

With reference to FIG. 1, a description will now be made of a series of copy processing steps performed with the scanner 10 and the printer 20.

When the user starts a copy preparing operation (parameter setting operation and the like) through the operation panel of the scanner 10 to perform copy processing, an occupancy notification is transmitted from the scanner 10 to the printer 20. Upon receiving the occupancy notification, the printer 20 transits itself to a state in which the printer 20 does not accept any print job or copy job from other scanners but the copy job from the scanner 10 that originates the occupancy notification (hereafter, this state is to be referred to as the "occupancy mode").

When the user has completed the a copy preparing operation on the scanner 10 side and has pressed the start button, original document image data is read from an original document, and a copy job of the original document image data that is described in a predetermined page description language is transmitted to and printed out by the printer 20.

Thus, the user, who operates the scanner 10 to perform copy processing, is allowed to occupy the printer 20 to perform the copy processing for a period of time from the start of the a copy preparing operation on the scanner 10 to the completion of the copy job corresponding thereto.

Figure 2:
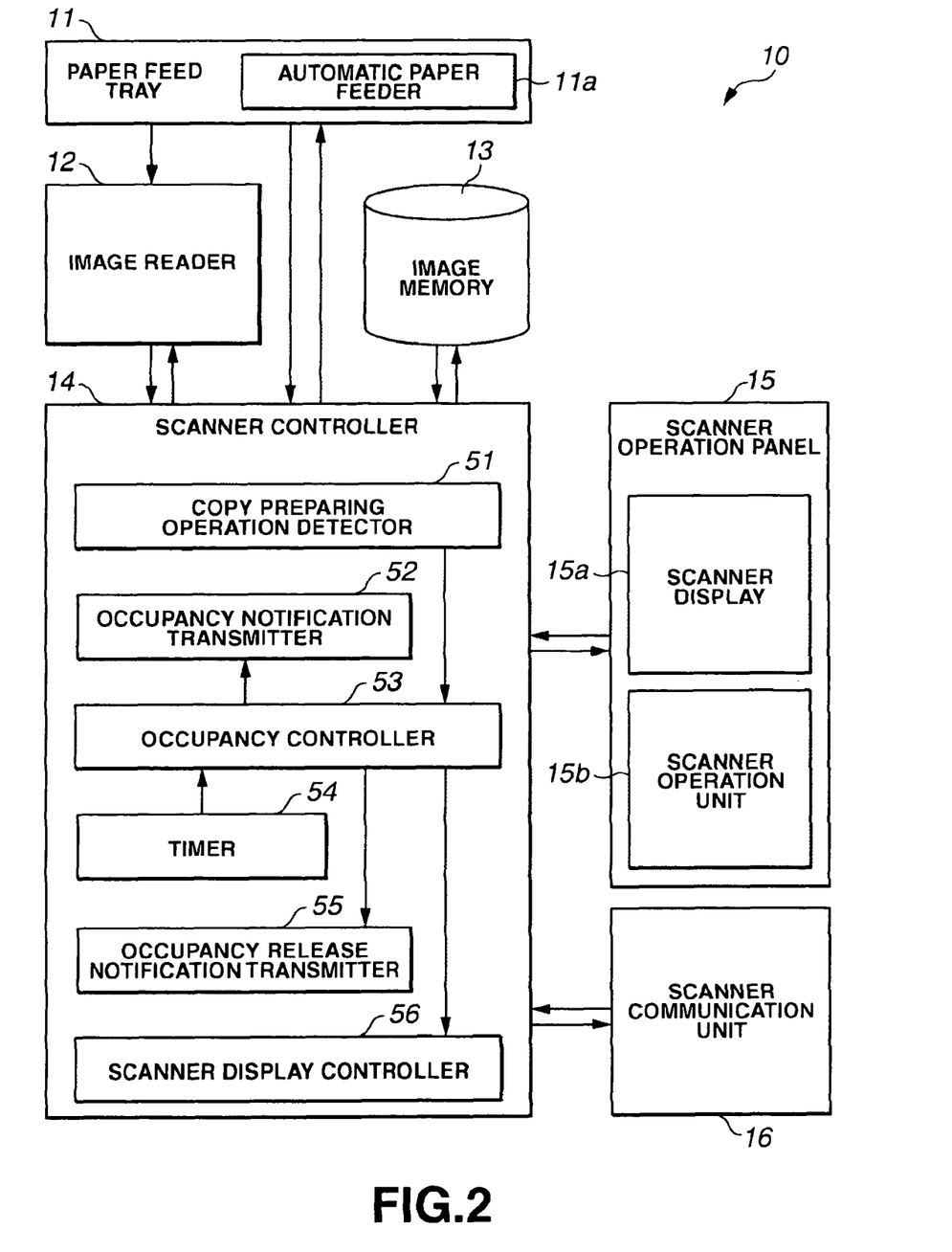
FIG. 2 is a block diagram showing an example of internal configuration of a scanner 10 according to the embodiment.

FIG. 2 is a block diagram showing an example of internal configuration of the scanner 10 according to the embodiment of the present invention. The following description will be made only of the components relating to the embodiment.

The scanner 10 includes a paper feed tray 11 to place thereon an original document to be scanned, an image reader 12 which has an illumination lamp, a lens system, and a CCD (Charge Coupled Device), and scans the original document placed on the paper feed tray 11 to read original document image data, an image memory 13 which temporarily caches the original document image data read by the image reader 12, a scanner controller 14 which is composed of a CPU (Central Processing Unit), a program memory, a working memory and so on, and integrally controls the scanner 10 by the CPU according a program stored in the program memory, a scanner operation panel 15 serving as a user interface connecting between the user and the scanner 10, and a scanner communication unit 16. The scanner communication unit 16 is a communication interface device that is composed of a network card, a USB port and so on, and connects between the scanner 10 and other apparatuses (such as the printer 20).

The paper feed tray 11 is provided with an automatic paper feeder 11a so that plural original documents placed on the tray are sequentially fed one by one by the automatic paper feeder 11a, and conveyed to a paper discharge tray (not shown) via a platen glass (not shown).

The image reader 12 scans the original document that is conveyed onto the platen glass by the automatic paper feeder 11a to read the original document image data. By repeating this operation, the original documents placed on the paper feed tray 11 can be read consecutively.

The scanner controller 14 controls operations of various components of the scanner 10 to control execution of a read job including the scanning, generation of a copy job, and transmission of the copy job. More specifically, the scanner controller 14 controls operations of the automatic paper feeder 11a and the image reader 12 to read original document image data from the original document, describes the original document image data in a predetermined page description language to generate a copy job, and transmits the copy job to the printer 20 via the scanner communication unit 16.

The scanner controller 14 includes, as various processing functional units, a copy preparing operation detector 51, an occupancy notification transmitter 52, an occupancy controller 53, a timer 54, an occupancy release notification transmitter 55, and a scanner display controller 56.

Upon starting the copy processing, the copy preparing operation detector 51 detects a copy preparing operation by the user. More specifically, the copy preparing operation detector 51 detects the user's a copy preparing operation by detecting opening/closing of the platen cover, placement of an original document on the paper feed tray 11 (automatic paper feeder 11a), transition to the copy menu screen on the scanner operation panel 15, or a key entry through the scanner operation panel 15 by a parameter setting operation of the user.

The following description of the present embodiment will be made in terms of a case in which the copy preparing operation detector 51 detects a key entry through the scanner operation panel 15 by a parameter setting operation of the user. Specifically, when a parameter setting operation such as designation of a paper size or a color mode, or setting of image quality parameters is performed through the scanner operation panel 15 for performing copy processing, the copy preparing operation detector 51 detects a key entry relating thereto.

When the copy preparing operation detector 51 detects such a copy preparing operation, the occupancy notification transmitter 52 transmits an occupancy notification to the printer 20. If the printer 20 is in the state where the execution of the copy job is not possible (the state where transition to the occupancy mode is not possible), for example if the printer 20 is executing a print job, the occupancy notification is transmitted repeatedly every time a predetermined interval has passed until the print job is completed and the printer 20 becomes able to transit to the occupancy mode. Even if the printer 20 is in the state where the transition to the occupancy mode is not possible, the transmission of the occupancy notification is stopped and transmission of the copy job is started if the start button is pressed.

The scanner occupancy controller 53 collectively controls operations relating the occupancy processing. This means that, during occupancy control processing, the various processing functional units forming the scanner controller 14 operate in accordance with instructions from the scanner occupancy controller 53.

Upon the start of occupancy of the printer 20, the timer 54 counts down the occupancy timer until the occupancy is released. When the occupancy timer is counted down to zero, an occupancy release notification is transmitted to the printer 20 to release occupancy of the printer 20. Accordingly, even if the user forgets to do the operation to release the occupancy of the printer, the operation will be automatically released by the timer. This makes it possible to avoid the problem that the occupancy of the printer causes the execution of a print job or a copy job from other scanner to be suspended for a long period of time.

The occupancy release notification transmitter 55 transmits an occupancy release notification to the printer 20 to release the occupancy (occupancy mode) of the printer 20. The occupancy release notification is transmitted at the time when the occupancy timer is counted down to zero, or when the occupancy release button provided on the scanner operation panel 15 is pressed. The occupancy release notification and the above-mentioned occupancy notification contain not only a command to instruct occupancy or release of occupancy, but also identification information of the terminal that transmits the notification.

Figure 3:
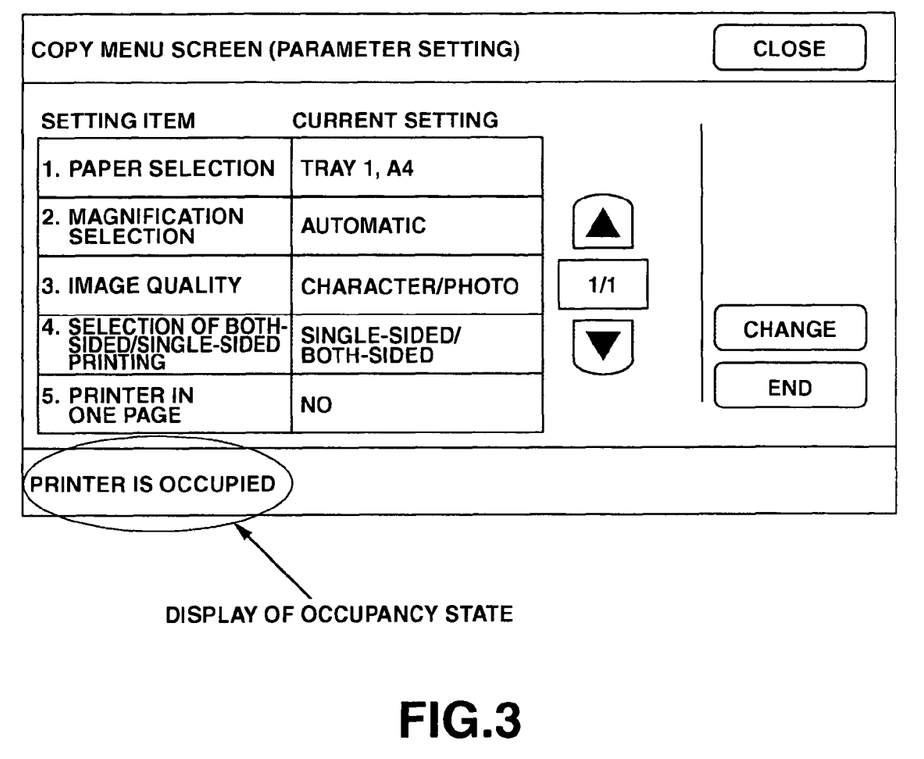
FIG. 3 is a diagram showing an example of a display mode of a scanner display 15a while the printer is being occupied.

The scanner display controller 56 displays a message indicating that the printer 20 is occupied. More specifically, the scanner display controller 56 displays a screen as shown in FIG. 3 to notify the user who is operating the scanner operation panel 15 of the fact that the printer 20 is occupied. The scanner display controller 56 may display the remaining time of the occupancy timer that is counted down by the timer 54 as described above. The foregoing is the description of the block diagram showing the internal configuration of the scanner 10 according to the embodiment of the present invention.

Figure 4:
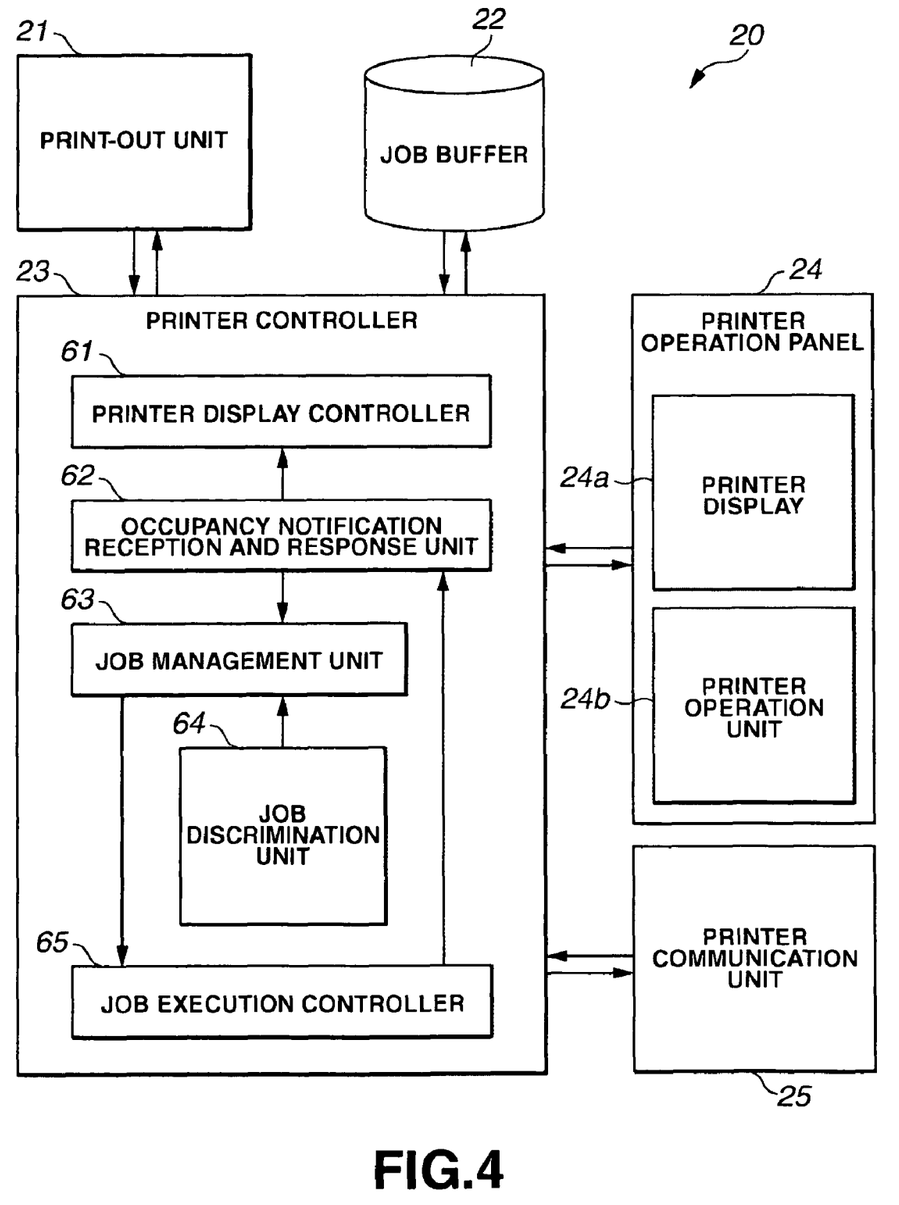
FIG. 4 is a block diagram showing an example of internal configuration of a printer 20 according to the embodiment.

FIG. 4 is a block diagram showing an example of internal configuration of the printer 20 according to the embodiment of the present invention. The following description will be made only of the components relating to the present invention.

The printer 20 includes a print-out unit 21 that is composed of a photoconductor drum, a transfer belt and the like and executes print processing based on a received print job, a job buffer 22 that is a memory for storing a print job, a printer controller 23 that is composed of a CPU (Central Processing Unit), a program memory, a working memory and the like, and collectively controls the printer 20 by the CPU according to the program stored in the program memory, a printer operation panel 24 that is a user interface connecting between the user and the printer 20, and a printer communication unit 25 that is composed of a network card, a USB port and the like, and serves as a communication interface device connecting between the printer 20 and other apparatuses (e.g., the scanner and the host terminals).

The printer controller 23 internally includes, as various processing functional units, a printer display controller 61, an occupancy notification reception and response unit 62, a job management unit 63, a job discrimination unit 64, and a job execution controller 65.

The printer display controller 61 displays a message indicating that the occupancy mode is active. This means that the printer display controller 61 performs similar processing to that of the scanner display controller 59 described above to notify the user of the fact that the printer is not able to execute a print job or a copy job although it is able to accept such a print job or a copy job from other scanner.

The occupancy notification reception and response unit 62 serves to receive an occupancy notification or occupancy release notification from the scanner 10 and return a response thereto. If the execution of the copy job is not possible at the time receiving this occupancy notification, the occupancy notification reception and response unit 62 returns to the scanner 10 a response indicating that the occupancy is not possible ("occupancy not possible response").

The job management unit 63 accepts a print job from the scanner 10 or the host terminal 30, and manages the job. More specifically, the job management unit 63 accepts a print job that is received via the scanner communication unit 16, transfers the print job to the job execution controller 65, and causes the job execution controller 65 to execute the accepted jobs sequentially. However, if the job management unit 63 receives a print job from other apparatus than the scanner 10 that is the originating source of the occupancy notification during the occupancy mode, the print job is stored in the job buffer 22 to suspend the execution thereof.

Accordingly, during the occupancy mode, any print job from an apparatus other than the scanner 10 that is the originating source of the occupancy notification is stored in the job buffer 22 to suspend the execution thereof. Therefore, during the occupancy mode, the printer 20 executes the copy job received from the scanner 10 that is the originating source of the occupancy notification.

The job discrimination unit 64 determines whether the received job is a print job received from the host terminal 30 or a copy job received from the scanner 10. If the job is a copy job, the job discrimination unit 64 further determines whether or not the job is a copy job received from the scanner 10 that is the originating source of the occupancy notification. This determination is made by referring to the header in the received job to identify the originating terminal and to determine whether the job is a print job or a copy job.

The job execution controller 65 controls operations of the various components forming the printer 20 to control the execution of a job. For example, when a copy job received from the scanner 10 is to be executed, the job execution controller 65 interprets the page description language in the copy job, and controls the operation of the print-out unit 21 to print out an image corresponding to the original document image data read by the scanner 10. The foregoing is the description of the block diagram showing the internal configuration of the printer 20 according to the embodiment of the present invention.

Figure 5:
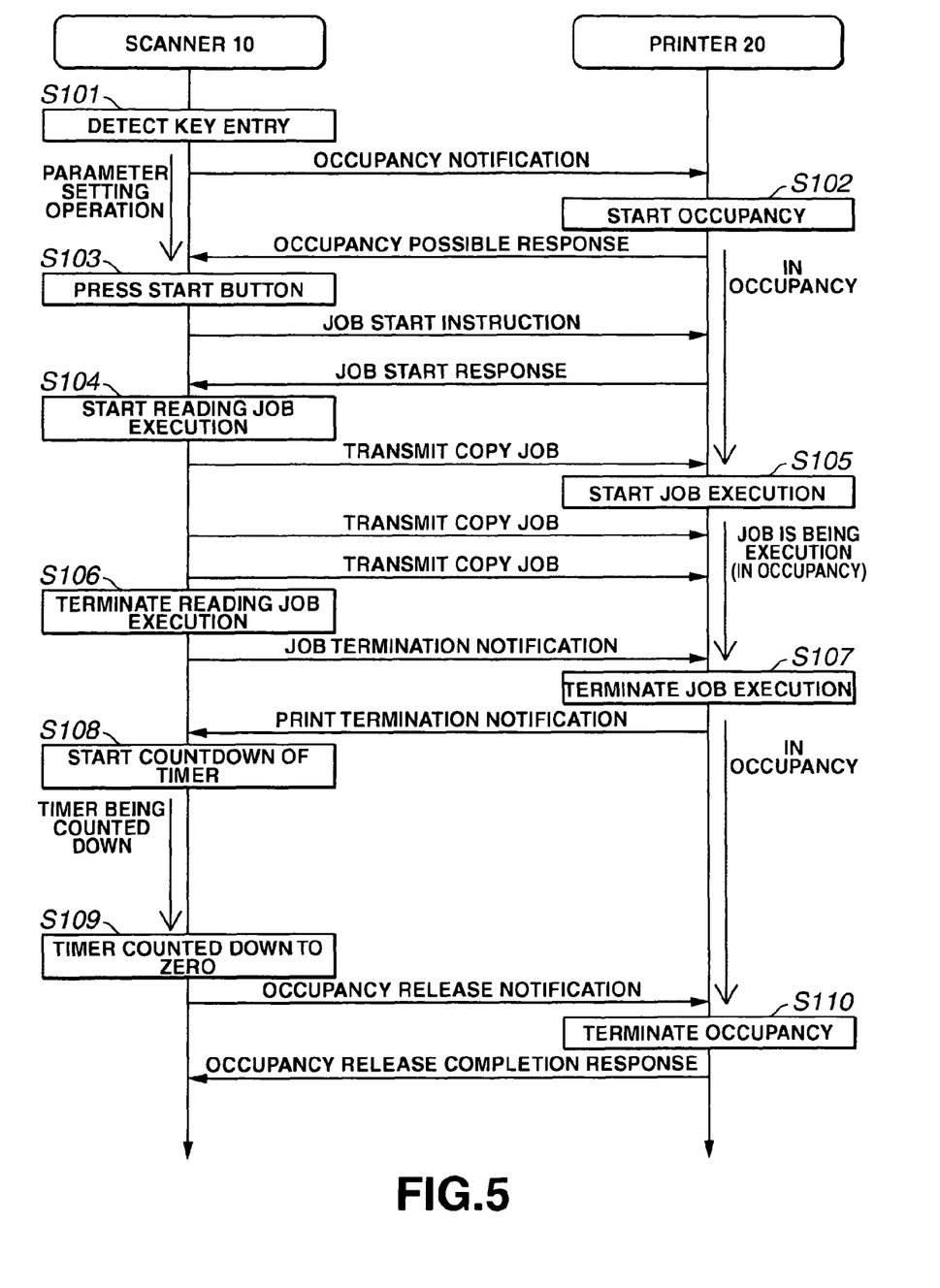
FIG. 5 is a sequence chart diagram showing an example of sequence of operations in the scanner 10 and the printer 20 during print processing according to the embodiment.
Figure 6:
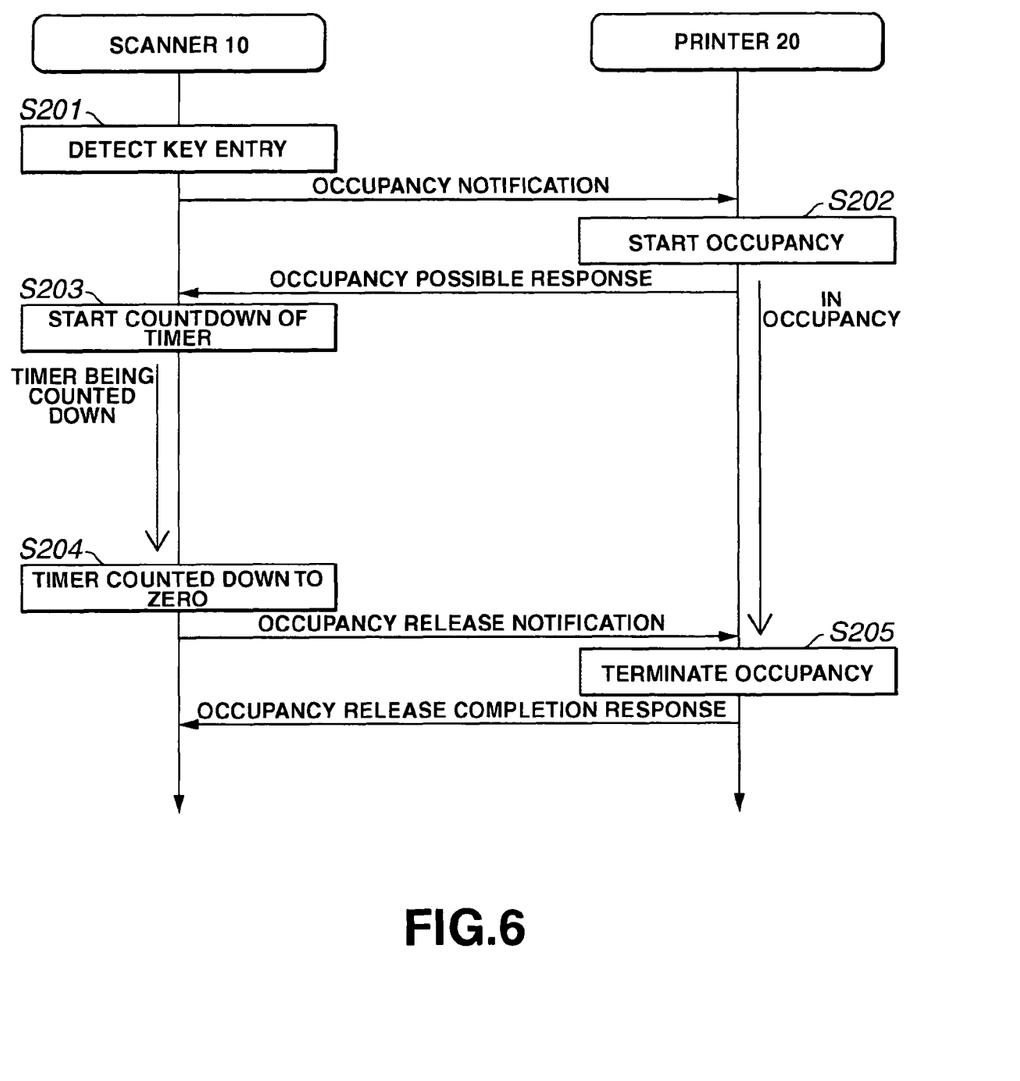
FIG. 6 is a sequence chart diagram showing an example of sequence of operations in the scanner 10 and the printer 20 if the occupancy is released by a timer according to the embodiment.
Figure 7:
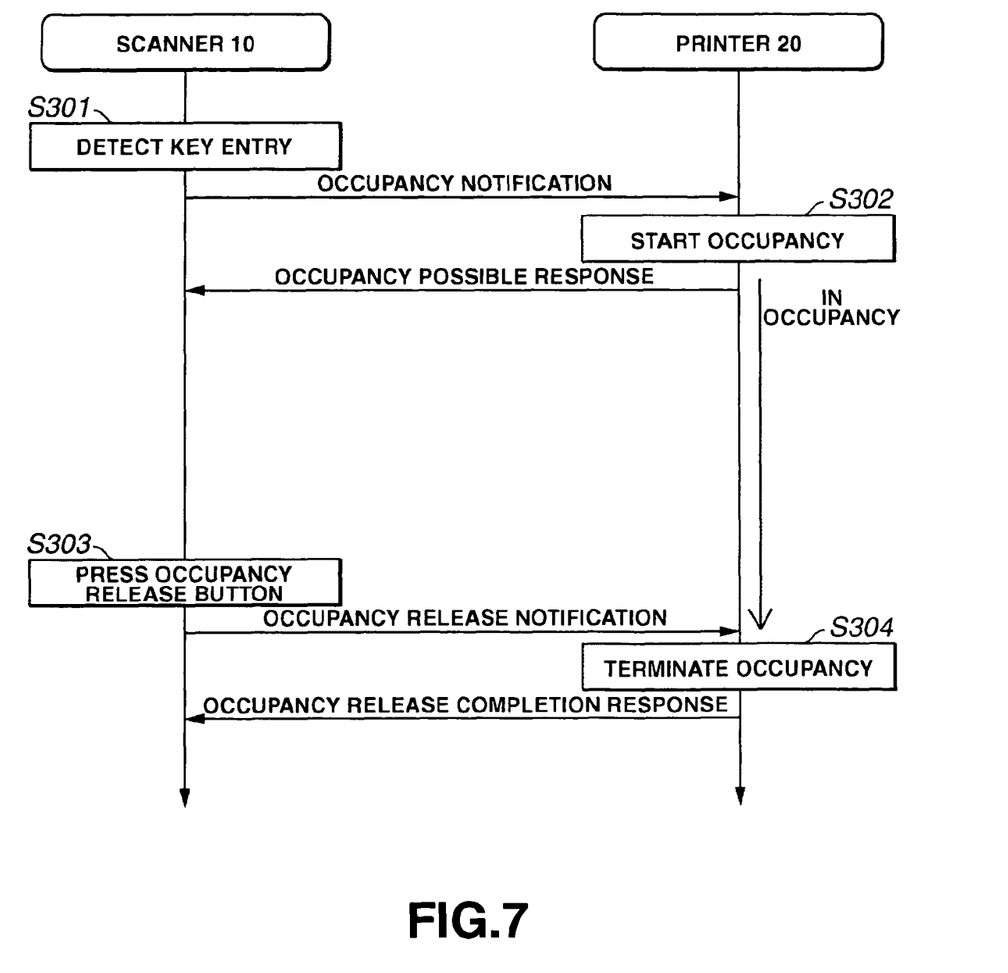
FIG. 7 is a sequence chart diagram showing an example of sequence of operations in the scanner 10 and the printer 20 if the occupancy is released by user's manipulation according to the embodiment.

FIGS. 5 to 7 are sequence chart diagrams each showing an example of a sequence of operations in the scanner 10 and the printer 20 according to the embodiment of the present invention. The description of FIGS. 5 to 7 will be made on the assumption that the printer 20 is not executing a job received from any other apparatus than the scanner 10.

Firstly, a description will be made, with reference to FIG. 5, of the outline of the operation to start or release occupancy when the scanner 10 and the printer 20 cooperate to perform copy processing.

When a parameter setting operation is performed through the scanner operation panel 15, and the key entry is detected (step S101), an occupancy notification is transmitted from the scanner 10 to the printer 20 to start occupancy of the printer 20 (step S102).

When the parameter setting operation is completed and the start button is pressed (step S103), a job start instruction and a job start response are exchanged between the scanner 10 and the printer 20, and then the scanner 10 starts execution of a read job. Copy jobs are sequentially transmitted to the printer 20 (step S104).

Receiving the copy job, the printer 20 starts execution of the job (step S105). When the scanner 10 has completed the read job of the original document (step S106), the scanner 10 transmits a job termination notification to the printer 20. When the printer 20 has finished the print processing on the copy jobs received from the scanner 10 (step S107), the printer 20 transmits a print termination notification to the scanner 10 to terminate the print processing.

Upon receiving the print termination notification, the scanner 10 starts counting down the occupancy timer (step S108), and counts down the timer until the occupancy is released. When the occupancy timer is counted down zero (step S109), an occupancy release notification is transmitted from the scanner 10 to the printer 20. Receiving the occupancy release notification, the printer 20 releases the occupancy mode (step S110), and returns an occupancy release completion response to terminate the processing.

A description will now be made, with reference to FIG. 6, of the outline of the operation to release occupancy of the printer 20 by means of a timer (occupancy timer). The following description will be made in terms of a case in which no copy processing is performed after occupancy of the printer 20.

When an parameter setting operation is performed through the scanner operation panel 15, and the key entry is detected (step S201), an occupancy notification is transmitted from the scanner 10 to the printer 20 to start occupancy of the printer 20 (step S202).

When occupancy of the printer 20 is started, an occupancy possible response is returned from the printer 20 to the scanner 10. Receiving this response, the scanner 10 starts counting down the occupancy timer (step S203), and counts down the timer until the occupancy is released.

If no copy processing is performed, and the occupancy timer is counted down to zero (step S204), an occupancy release notification is transmitted from the scanner 10 to the printer 20. Receiving the occupancy release notification, the printer 20 releases the occupancy mode (step S205), and returns an occupancy release completion response to terminate the processing.

A description will now be made, with reference to FIG. 7, of the outline of the operation to release occupancy of the printer 20 by the user's manipulation (by the user pressing the occupancy release button).

When a parameter setting operation is made through the scanner operation panel 15, and the key entry is detected (step S301), an occupancy notification is transmitted from the scanner 10 to the printer 20 to start occupancy of the printer 20 (step S302).

If the occupancy release button is pressed, an occupancy release notification is transmitted from the scanner 10 to the printer 20. Receiving the occupancy release notification, the printer 20 releases the occupancy mode (step S304), and returns an occupancy release completion response to terminate the processing.

Operations of the scanner 10 according to the embodiment of the present invention will now be described with reference to FIGS. 8 and 9.

Figure 8:
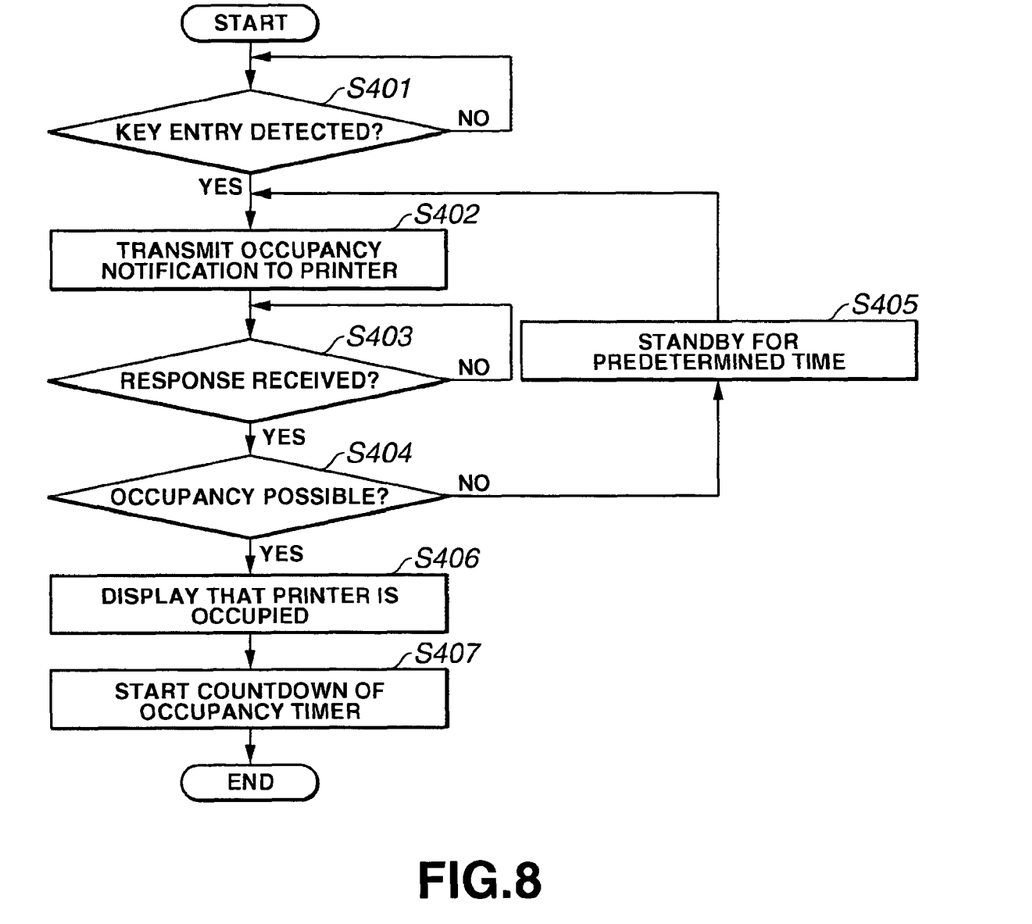
FIG. 8 is a flowchart showing an example of operation of the scanner 10 when occupancy is started according to the embodiment of the present invention.

FIG. 8 is a flowchart showing an example of operation of the scanner 10 when occupancy of the printer is started.

The scanner 10 is on standby until a parameter setting operation for starting copy processing is performed by the user (NO in step S401). If the parameter setting operation is performed by the user, the key entry corresponding thereto is detected by the copy preparing operation detector 51 (YES in step S401).

Upon the key entry being detected, the scanner 10 transmits an occupancy notification from the occupancy notification transmitter 52 to the printer 20 (step S402), and becomes standby until receiving a response to the occupancy notification (NO in step S403).

Upon receiving a response to the occupancy notification from the printer 20, the scanner occupancy controller 53 refers to contents of the response message to determine whether occupancy of the printer 20 is possible or not (step S404). This means that, it is determined whether the received response is an occupancy possible response or an occupancy not possible response.

If it is determined that the response received from the printer 20 is an occupancy not possible response (No in step S404), the scanner 10 will transmit another occupancy notification to the printer 20 after standby for a predetermined time (step S405). As described above, if the start button is pressed during this retransmission of the occupancy notification, the retransmission processing is suspended and transmission of a copy job is started.

In contrast, if the response received from the printer 20 is an occupancy possible response (YES in step S404S), the scanner display controller 56 displays, on the scanner display 15a, a message indicating that the printer is occupied (step S406). At the same time, the timer 54 starts counting down the occupancy timer (step S407), and the processing is terminated.

Figure 9:
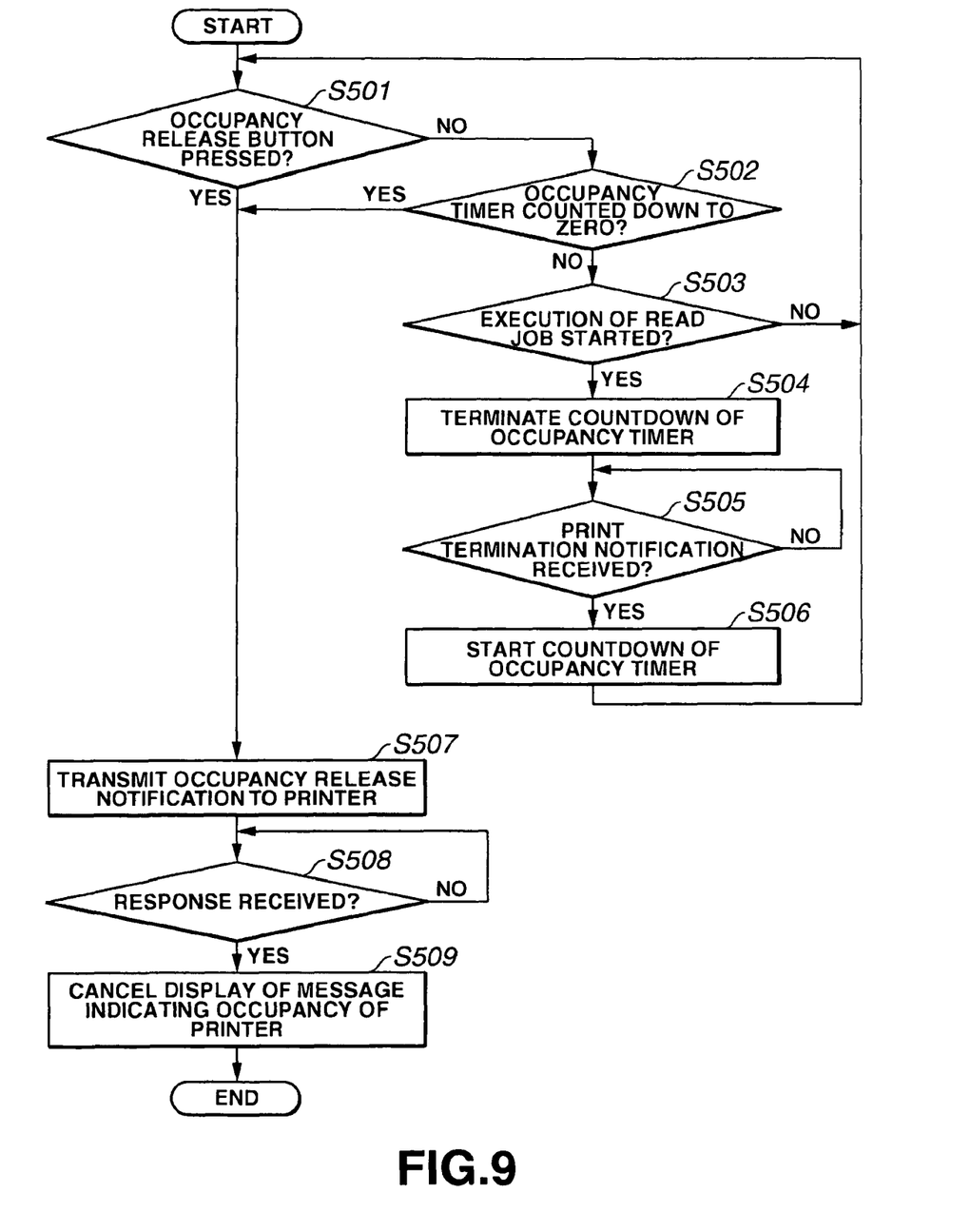
FIG. 9 is a flowchart showing an example of operation of the scanner 10 when occupancy is released according to the embodiment of the present invention.

FIG. 9 is a flowchart showing an example of operation of the scanner 10 when occupancy of the printer is released. The following description will be made on the assumption that the processing described above with reference to FIG. 8 has been performed and the printer is occupied.

The scanner 10 is on standby until the occupancy release button is pressed (YES in step S501), or the occupancy timer is counted down to zero (YES in step S502). When the occupancy release button is pressed (YES in step S501), the occupancy release notification transmitter 55 transmits an occupancy release notification to the printer 20 (step S507), and the occupancy release processing is started.

After the occupancy release notification is transmitted, the scanner 10 is on standby until receiving a response to the notification (No in step S508). Upon receiving an occupancy release completion response from the printer 20 as the response to the notification (YES in step S508), the scanner display controller 56 cancels the display of the message indicating the printer is occupied that is displayed on the scanner display 15a (step S509), and the processing is terminated.

When the occupancy timer is counted down to zero without execution of a read job being started, (No in step S501 and then YES in step S502), similar processing to the one described above is performed to execute occupancy release processing. Whereas, if the start button is pressed during the countdown of the occupancy timer (NO in step S502) and execution of a read job is started (YES in step S503), the occupancy timer that is being counted down is reset to terminate the countdown processing (step S504).

Upon termination of the countdown processing, the scanner 10 is put on standby to wait for receiving a print termination notification from the printer 20 (NO in step S505). When the scanner 10 receives a print termination notification from the printer 20 upon completion of the print processing (YES in step S505), the timer 54 restarts counting down the occupancy timer (step S506), and the scanner 10 again resumes the standby state until the occupancy release button is pressed, or the occupancy timer is counted down to zero.

In the processing described with reference to FIG. 9, no consideration is given to the case where the occupancy release button is pressed during the standby for reception of a print termination notification in step S505. If the occupancy release button is pressed during this standby state, the occupancy release processing described above is executed to release the occupancy of the printer 20.

A description will now be made of operation of the printer 20 according to the embodiment of the present invention with reference to FIGS. 10 and 11.

Figure 10:
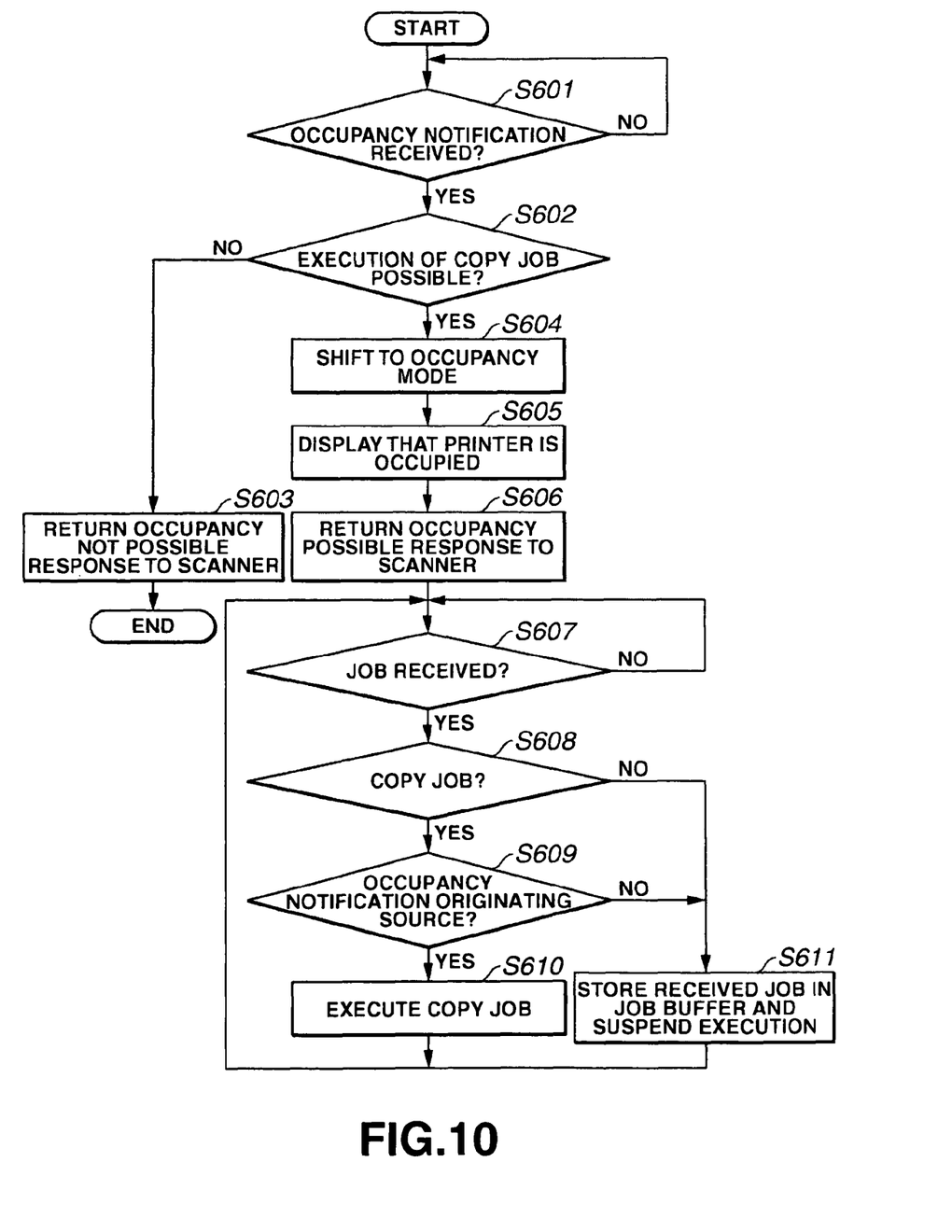
FIG. 10 is a flowchart showing an example of operation of the printer 20 at the time of transition to the occupancy mode, and during the occupancy mode according to the embodiment of the present invention.

FIG. 10 is a flowchart showing an example of operation of the printer 20 at the time of transition to the occupancy mode or during the occupancy mode.

The printer 20 is on standby until receiving an occupancy notification from the scanner 10 (NO in step S601). Upon receiving an occupancy notification transmitted from the scanner 10 (YES in step S601), the occupancy notification reception and response unit 62 queries the job execution controller 65 about the job execution state, so that the occupancy notification reception and response unit 62 determines whether execution of the copy job is possible or not (step S602).

If it is determined that execution of the copy job is not possible (NO in step S602), an occupancy not possible response is returned from the occupancy notification reception and response unit 62 to the scanner 10 (step S603), and the processing is terminated. In contrast, if it is determined that execution of the copy job is possible (YES in step S602), the printer 20 transits to the occupancy mode (step S604). Specifically, the printer 20 transits to the state in which, although the printer 20 accepts a print job or a copy job from other scanners, it gives a priority in accepting a copy job from the scanner 10 that is the originating source of the occupancy notification.

Upon transition to the occupancy mode, the printer display controller 61 displays, on the printer display 24a, a message indicating that the printer 20 is occupied (step S605) and, at the same time, the occupancy notification reception and response unit 62 returns an occupancy possible response to the scanner 10 (step S606).

The printer 20 then resumes the standby state to wait for receiving a job (NO in step S607). If a job is received (YES in step S607), the job discrimination unit 64 determines the originating source of the job. As described above, the originating source terminal is identified by referring to the header in the job, and it is determined whether the job is a print job a copy job.

If it is determined that the received job is a print job (NO in step S608), the job management unit 63 stores the job in the job buffer 22 to suspend execution thereof (step S611), and the printer 20 again resumes the standby state to wait for reception of a job. In contrast, if it is determined that the received job is a copy job (YES in step S608), the job discrimination unit 64 further determines whether the job is a copy job from the scanner 10 that is the originating source of the occupancy notification (step S609).

If the job is not a copy job from the scanner 10 that is the originating source of the occupancy notification (NO in step S609), the job is stored in the job buffer 22 to suspend execution thereof (step S611), and the printer 20 again resumes the state of waiting for reception of a job. In contrast if the job is a copy job from the scanner 10 that is the originating source of the occupancy notification (YES in step S609), the job management unit 63 transfers the job to the job execution controller 65 to execute the job (step S610). Thereafter, the printer 20 again resumes the standby state to wait for reception of a job.

Figure 11:
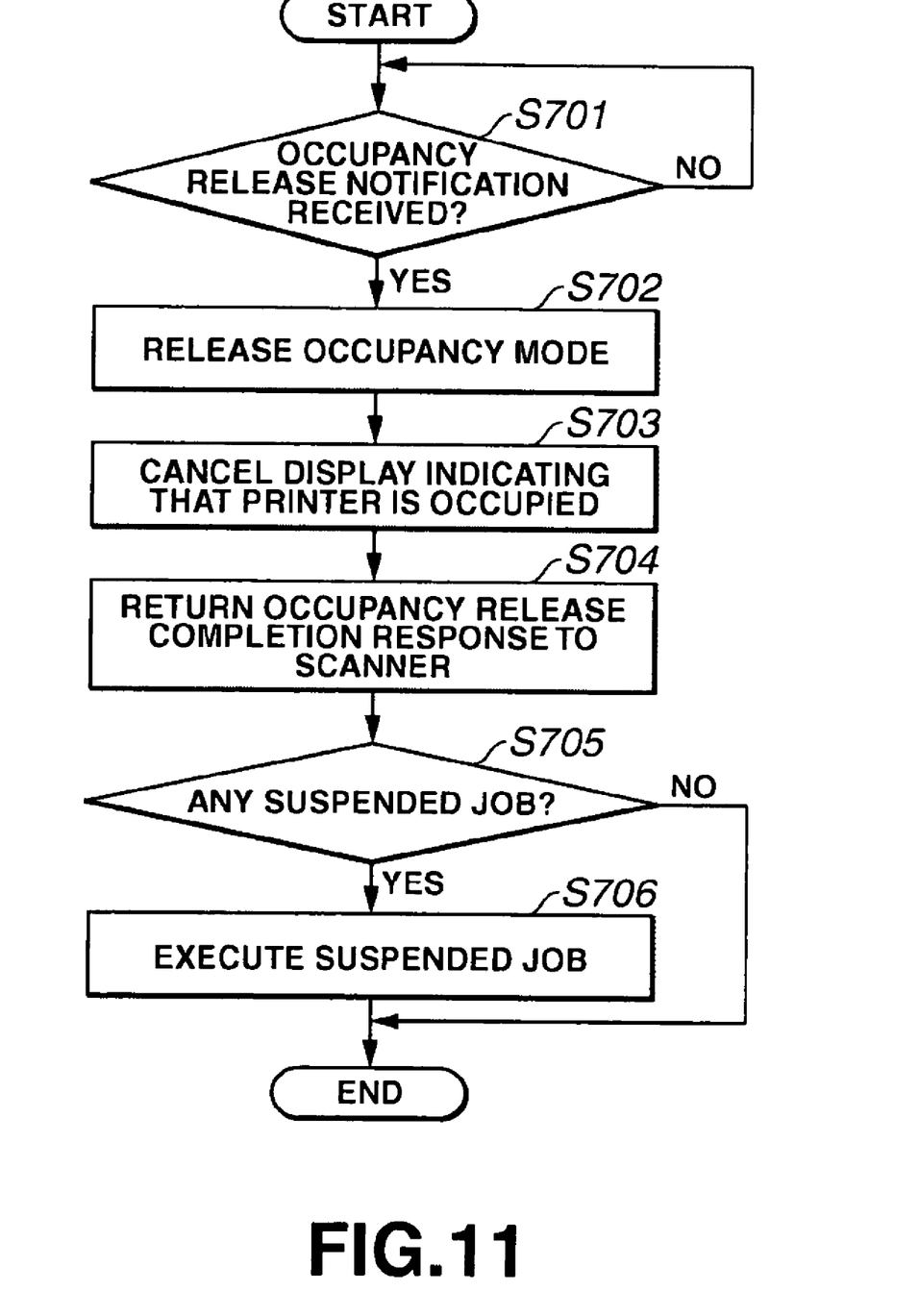
FIG. 11 is a flowchart showing an example of operation of the printer 20 when the occupancy mode is released according to the embodiment of the present invention.

FIG. 11 is a flowchart showing an example of operation of the printer 20 when the occupancy mode is released. The following description will be made on the assumption that the processing described with reference to FIG. 10 has been performed and the occupancy mode is active.

The printer 20 is on standby until receiving an occupancy release notification from the scanner 10 (NO in step S701). When the occupancy release notification reception unit 62 receives an occupancy release notification from the scanner 10 (YES in step S701S), the printer 20 releases the occupancy mode (step S702).

When the occupancy mode is released, the printer display controller 64 cancels the display of the message on the printer display 24a indicating that the printer is occupied (step S703), and an occupancy release completion response is returned from the occupancy notification reception and response unit 62 to the scanner 10 (step S704).

When the occupancy release completion response is returned, the job management unit 63 determines whether there is any job held in the job buffer 22 (step S705). If there is no job held in the job buffer 22 (NO in step S705), the processing is terminated directly. In contrast, if there is any job held therein (YES in step S705), the job management unit 63 transfers the job to the job execution controller 65 to execute the same (step S706). The processing is then terminated.

According to the embodiment of the present invention as described above, an occupancy notification is transmitted from the scanner 10 to the printer 20 in response to detection of a key entry through the scanner operation panel 15 to cause the printer 20 to transit to the occupancy mode. Therefore, the user who is going to perform copy processing through the scanner 10 is allowed to occupy the printer 20 from the copy preparation stage. Particularly, the user can be prevented from being obliged to wait in front of the scanner 10 due to execution of other job that has been accepted by the printer 20 during the copy preparation stage.

The present invention is not limited to the embodiment described above and illustrated in the accompanying drawings, and may be modified without departing from the spirit and scope thereof. Several examples of modifications to the print system described above are shown below.

(a) In the above-described embodiment, if the printer 20 is in the state where execution of a copy job is not possible (in the state where transition to the occupancy mode is not possible), the transition of the printer 20 to the occupancy mode is suspended until it becomes possible. However, the present invention is not limited to this, the printer 20 may be designed to transit to the occupancy mode immediately upon receiving an occupancy notification, regardless of the state of the printer 20. For example, if the printer 20 is not able to transit to the occupancy mode because it is executing a print job, the print job that is being executed may be interrupted to enable the printer 20 to transit to the occupancy mode.

(b) In the above-described embodiment, if the printer 20 receives, during the occupancy mode, a job from a scanner other than the scanner 10 that is the originating source of the occupancy notification, the received job is stored in the job buffer 22 to suspend execution of the job. However, the present invention is not limited to this, and it may be modified such that, when the occupancy mode is active, the printer does not receive any job from any other terminal than the scanner 10 that is the originating source of the occupancy notification (or cancels the job after receiving the same), and returns a message indicating that the printer is occupied, to the terminal that has transmitted the job.

(c) In the above-described embodiment, upon receiving a print termination notification, the scanner 10 starts counting down the occupancy timer, and transmits an occupancy release notification at the time when the occupancy timer is counted down to zero. However, the present invention is not limited to this, and it may modified such that an occupancy release notification is transmitted upon receiving the print termination notification (without counting down the timer) to release the occupancy mode of the printer 20.

(d) In the above-described embodiment, the copy preparing operation detector 51 detects a key entry that is made through the scanner operation panel 15 by the parameter setting operation for copy processing. However, the present invention is not limited to this, and it may be modified such that the copy preparing operation detector 51 detects any of opening/closing of the platen cover, placement of an original document on the paper feed tray 11 (automatic paper feeder 11a), and transition to the copy menu screen on the scanner operation panel 15, prior to starting copy processing, and starts occupancy of the printer similarly to when a key entry through the scanner operation panel 15 is detected.

According to the present invention, a copy preparing operation that is performed prior to transmission of a copy job is detected, and an occupancy notification is transmitted from the image reading apparatus to the printing apparatus in response to the detection thereof so that, based on the notification, the printing apparatus is made to transit to the occupancy mode in which the printing apparatus accepts a copy job from the image reading apparatus only. Accordingly, the user who is going to perform copy processing is allowed to occupy the printing apparatus from the copy preparation stage, and thus is prevented from being obliged to wait in front of the image reading apparatus due to execution of other jobs that the printing apparatus has accepted during the copy preparation stage.

The print system and the control method therefor according to the present invention are applicable to print systems in general having an image reading apparatus and a printing apparatus, and are particularly effective when used in offices (e.g., company and government offices) and schools where a printing apparatus is shared by many people.

As described above, according to an aspect of the present invention, a print system comprises an image reading apparatus that reads original document image data from an original document, describes the original document image data thus read in a page description language, and transmits the data described in the page description language as a copy job; and a printing apparatus that receives the copy job transmitted from the image reading apparatus, and prints out an image corresponding to the original document image data based on the copy job, wherein the image reading apparatus comprises a detector that detects a copy preparing operation that is performed prior to the transmission of the copy job; and an occupancy notification transmitter that transmits an occupancy notification for notifying occupancy of the printing apparatus to the printing apparatus when the copy preparing operation is detected by the detector, and wherein the printing apparatus is shifted to an occupancy mode in which a copy job from the image reading apparatus is accepted in accordance with the occupancy notification transmitted from the occupancy notification transmitter.

According to another aspect of the present invention, the detector may detect the copy preparing operation based on detection of any of opening or closing of a platen cover, placement of an original document on a paper feed tray, transition of screen to a copy menu screen, and a key entry through the copy menu screen.

According to still another aspect of the present invention, the image reading apparatus may further comprise an occupancy release notification transmitter that transmits an occupancy release notification for notifying a release of the occupancy mode to the printing apparatus, and the printing apparatus releases the occupancy mode in accordance with the occupancy release notification transmitted from the occupancy release notification transmitter.

According to even another aspect of the present invention, the image reading apparatus may further comprise a timer that counts a predetermined time elapsed from the transition of the printing apparatus to the occupancy mode, and the occupancy release notification transmitter transmits the occupancy release notification to the printing apparatus if a copy operation to transmit the copy job is not performed before the timer has counted the predetermined time.

According to yet another aspect of the present invention, the image reading apparatus may reset the counting of the timer if the copy operation is performed before the timer has counted the predetermined time, and restarts the counting of the timer upon reception of a print termination notification from the printing apparatus.

According to further aspect of the present invention, the occupancy release notification transmitter may transmit the occupancy release notification to the printing apparatus when an occupancy release button that is provided on an operation panel is pressed to instruct release of the occupancy mode.

According to still further aspect of the present invention, if the printing apparatus is in a state in which it is unable to execute the copy job when the occupancy notification is received, the printing apparatus may reply to the image reading apparatus that the occupancy is not possible.

According to even further aspect of the present invention, the image reading apparatus may further comprise a display controller that displays a message informing that the printing apparatus has been shifted to the occupancy mode on a display when the printing apparatus has been shifted to the occupancy mode.

According to yet further aspect of the present invention, in a control method for a print system having an image reading apparatus that reads original document image data from an original document, describes the original document image data thus read in a page description language, and transmits the data described in the page description language as a copy job; and a printing apparatus that receives the copy job transmitted from the image reading apparatus, and prints out an image corresponding to the original document image data based on the copy job, the control method comprises detecting, by a detector of the image reading apparatus, a copy preparing operation that is performed prior to the transmission of the copy job; transmitting, by an occupancy notification transmitter of the image reading apparatus, an occupancy notification for notifying occupancy of the printing apparatus from the image reading apparatus to the printing apparatus when the copy preparing operation is detected by the detector; shifting the printing apparatus to an occupancy mode in which a copy job from the image reading apparatus is accepted in accordance with the occupancy notification transmitted from the occupancy notification transmitter; transmitting an occupancy release notification from the image reading apparatus to the printing apparatus when the occupancy mode in the printing apparatus is to be released; and allowing the printing apparatus to release the occupancy mode when the printing apparatus receives the occupancy release notification.

The foregoing description of the embodiment of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-203129 filed on Jul. 12, 2005 including specification, claims, drawings and abstract is incorporated herein by reference in its entirety.

What is claimed is:

1. A print system comprising:
    an image reading apparatus that reads original document image data from an original document, describes the original document image data thus read in a page description language, and transmits the data described in the page description language as a copy job; and
    a printing apparatus that receives the copy job transmitted from the image reading apparatus, and prints out an image corresponding to the original document image data based on the copy job,
    wherein the image reading apparatus comprises:
    a detector that detects a copy preparing operation that is performed prior to the transmission of the copy job; and
    an occupancy notification transmitter that transmits an occupancy notification for notifying occupancy of the printing apparatus to the printing apparatus when the copy preparing operation is detected by the detector, and
    wherein the printing apparatus is shifted to an occupancy mode in which a copy job from the image reading apparatus is accepted in accordance with the occupancy notification transmitted from the occupancy notification transmitter,
    the printing apparatus in the occupancy mode refuses to receive any job from any image reading apparatus other than the image reading apparatus that is an originating source of the occupancy notification, and
    if the printing apparatus is printing a job when the occupancy notification is received, the printing apparatus replies to the image reading apparatus that occupancy is not possible, and the image reading apparatus repeatedly transmits the occupancy notification after predetermined intervals of time have passed until the printing apparatus shifts to an occupancy mode.

2. The print system according to claim 1, wherein the detector detects the copy preparing operation based on detection of any of opening or closing of a platen cover, placement of an original document on a paper feed tray, transition of screen to a copy menu screen, and a key entry through the copy menu screen.

3. The print system according to claim 1, wherein the image reading apparatus further comprises an occupancy release notification transmitter that transmits an occupancy release notification for notifying a release of the occupancy mode to the printing apparatus, and the printing apparatus releases the occupancy mode in accordance with the occupancy release notification transmitted from the occupancy release notification transmitter.

4. The print system according to claim 3, wherein the image reading apparatus further comprises a timer that counts a predetermined time elapsed from the transition of the printing apparatus to the occupancy mode, and
    the occupancy release notification transmitter transmits the occupancy release notification to the printing apparatus if a copy operation to transmit the copy job is not performed before the timer has counted the predetermined time.

5. The print system according to claim 4, wherein the image reading apparatus resets the counting of the timer if the copy operation is performed before the timer has counted the predetermined time, and restarts the counting of the timer upon reception of a print termination notification from the printing apparatus.

6. The print system according to claim 3, wherein the occupancy release notification transmitter transmits the occupancy release notification to the printing apparatus when an occupancy release button that is provided on an operation panel is pressed to instruct release of the occupancy mode.

7. The print system according to claim 1, wherein if the printing apparatus is in a state in which it is unable to execute the copy job when the occupancy notification is received, the printing apparatus replies to the image reading apparatus that the occupancy is not possible.

8. The print system according to claim 1, wherein the image reading apparatus further comprises a display controller that displays a message informing that the printing apparatus has been shifted to the occupancy mode on a display when the printing apparatus has been shifted to the occupancy mode.

9. A control method for a print system having an image reading apparatus that reads original document image data from an original document, describes the original document image data thus read in a page description language, and transmits the data described in the page description language as a copy job; and a printing apparatus that receives the copy job transmitted from the image reading apparatus, and prints out an image corresponding to the original document image data based on the copy job,
    wherein the control method comprises:
    detecting, by a detector of the image reading apparatus, a copy preparing operation that is performed prior to the transmission of the copy job;
    transmitting, by an occupancy notification transmitter of the image reading apparatus, an occupancy notification for notifying occupancy of the printing apparatus from the image reading apparatus to the printing apparatus when the copy preparing operation is detected by the detector;
    shifting the printing apparatus to an occupancy mode in which a copy job from the image reading apparatus is accepted in accordance with the occupancy notification transmitted from the occupancy notification transmitter, the printing apparatus in the occupancy mode refusing to receive any job from any image reading apparatus other than the image reading apparatus that is an originating source of the occupancy notification;
    transmitting an occupancy release notification from the image reading apparatus to the printing apparatus when the occupancy mode in the printing apparatus is to be released; and allowing the printing apparatus to release the occupancy mode when the printing apparatus receives the occupancy release notification, wherein if the printing apparatus is printing a job when the occupancy notification is received, the printing apparatus replies to the image reading apparatus that occupancy is not possible, and the image reading apparatus repeatedly transmits the occupancy notification after predetermined intervals of time have passed until the printing apparatus shifts to an occupancy mode.

* * * * *